United States Patent [19]

Lill

[11] Patent Number: 5,025,459

[45] Date of Patent: * Jun. 18, 1991

[54] OPTICAL COMMUNICATIONS TRANSMITTER AND RECEIVER

[75] Inventor: Thomas M. Lill, Port Huron, Mich.

[73] Assignee: Optical Communications Corp., Silver Spring, Md.

[*] Notice: The portion of the term of this patent subsequent to Jul. 25, 2006 has been disclaimed.

[21] Appl. No.: 383,537

[22] Filed: Jul. 24, 1989

Related U.S. Application Data

[63] Continuation of Ser. No. 888,203, Jul. 23, 1986, Pat. No. 4,852,128.

[51] Int. Cl.[5] .......................... H04L 25/38; H04L 7/06
[52] U.S. Cl. ..................................... 375/117; 375/113; 370/48; 370/99; 370/106
[58] Field of Search .................... 370/48, 99, 105, 106, 370/105.5; 380/48; 375/113, 117

[56] References Cited

U.S. PATENT DOCUMENTS 3,430,204  2/1969  Milford .............................. 375/117
4,413,336 11/1983  Chaillié et al. ..................... 370/105
4,589,120  5/1986  Mendala ............................. 375/117

Primary Examiner—Thomas H. Tarcza
Assistant Examiner—Linda J. Wallace
Attorney, Agent, or Firm—Antonelli, Terry, Stout & Kraus

[57] ABSTRACT

An improved digital communications system is disclosed in which synchronization information is transmitted with the data. A start pulse, having a duration different than the other pulses in the transmitted digital data signal is used to mark the beginning of the frame of digital data. Preferably, a midpoint pulse is also transmitted with the start pulse to mark the midpoint of the frame to facilitate the generation of a local clock signal. Bit positions within the transmitted signal are sampled by sampling pulses which are generated by digital timers having time intervals keyed to the start and midpoint pulses.

6 Claims, 17 Drawing Sheets (CTS DELAY CKT.)

OPTICAL COMMUNICATIONS TRANSMITTER AND RECEIVER

This is a continuation of U.S. Ser. No. 06/888,203, filed July 23, 1986, now U.S. Pat. No. 4,852,128.

BACKGROUND OF THE INVENTION

1. Field of the Invention

The invention relates to digital data transmission systems in which clock information, data and other information is transmitted within a single baud and, more particularly, to the aforementioned systems used with optical communication mediums.

2. Description of the Prior Art

Digital data transmitting systems, used, for example, with telephone communication links, are known in which two or more bits are transmitted per baud. These systems are known as synchronous modems. See *Understanding Data Communications*, George E. Friend, John L. Fike, H. Charles Baker and John C. Bellamy, Chap. 5, "Synchronous Modems and Digital Transmission", p. 5-2, copyright Texas Instruments, Inc. 1984 published by Radio Shack.

SUMMARY OF THE INVENTION

The present invention provides a system for the synchronous data transmission of multiple bits per baud in which a start signal and an optional midpoint signal is used to encode the clock signal used for sampling data transmitted within the baud at the receiver having a plurality of bit positions which may assume a zero or one level. The bit positions may be used to encode diverse signals such as, but not limited to, the address of the receiver which is to receive the frames of transmitted data, priority information, general control and command information, basic data to be processed by the receiver and a RTS signal which is transmitted by the transmitter to inform the receiver of the operational state of the transmitter. The invention utilizes a start pulse, having a duration different than all of the other pulses including the optional midpoint pulse and the bits to be transmitted to mark the beginning of a frame which is required to provide correct processing of data at the receiver in accordance with the basic frame rate. The preferred embodiment of the present invention is a system used with a fiber optic transmission medium which contains both transmitting and receiving circuitry for full duplex communications.

In the preferred embodiment, the receiver precisely generates a derived synchronizing clock signal occurring at the basic baud rate by the control of a bistable element with the start pulse and midpoint pulse. The resultant generated clock signal from the output of the bistable element in practice has proved to be highly stable and meets the V.35 specification.

The invention has the advantage that the system will process information at different baud rates simply by the change of the frequency of the master clock signal throughout the system.

A method of transmitting a data signal comprised of a plurality of bits per frame of a predetermined duration in accordance with the preferred embodiment of the invention includes the steps of providing a digital data signal to be transmitted having a series of bit positions having a first level or a second level; providing a train of pulses comprising a start pulse which marks the beginning of a frame and a midpoint pulse which marks the midpoint of the frame; and combining the digital data signal with the train of pulses to form the frame of the data signal, the frame having an even number of bit positions within the frame for transmitting the digital data signal in the form of bits, each of the bits which occur at the bit positions and the midpoint pulse having a duration which is different from the duration of the start pulse.

A method of transmitting a digital signal having a plurality of bits occurring in a frame with successive frames occurring at a frame rate in accordance with the invention includes the steps providing a basic data signal having a basic frequency equal to the basic frame rate; sampling the basic data signal at a predetermined time within the frame to form one of the bits of the frame; providing other signals to be encoded as the other bits within the frame; sampling the other signals which are to be encoded as the remaining bits of the frame at predetermined times within the frame with each other signal and the basic data signal being sampled at a separate time within the frame; combining the sampled signals to form the frame; and transmitting the frame. The other signals may be used for diverse purposes including but not limited to control, priority and addressing.

A receiver for receiving a transmitted data signal comprised of one or more frames of binary data which occur at a frame rate with each frame having a start pulse of a first time duration which marks the beginning of the frame, a midpoint pulse which marks the midpoint of the frame and a plurality of bit positions within the frame for transmitting digital data with the midpoint pulse and each bit having a second time duration different than the first time duration in accordance with the preferred embodiment includes a signal receiver for receiving the frames of transmitted data; a detector coupled to the receiver for detecting the start pulse having an output on which the set pulse is produced; a detector coupled to the receiver for detecting the midpoint pulse and having an output on which the reset pulse is produced; a bistable circuit having a set input for causing an output signal to assume a set level, a reset input for causing the output signal to assume a reset level different than the set level with the output of the detector for the start pulse being coupled to the set input and the output of the detector for detecting the midpoint pulse being coupled to the reset input and an output for producing a clock signal of the same frequency as the frame rate; a sampler for sampling the bit positions, coupled to the detector for detecting the start pulse and the detector for detecting the midpoint pulse, which samples the bit positions at fixed time intervals keyed to the start and midpoint pulses; and a storage coupled to the sampler and the output of the bistable circuit for processing the bit positions at the frame rate.

The storage includes a plurality of keyed storage circuits each coupled to the receiver with each keyed storage sampling a different one of the bit positions, half of the keyed storage circuits being coupled to the detector for detecting the start pulse and keyed to sample bit positions at time intervals measured from the occurrence of the start pulse and half of the keyed storage circuits being coupled to the detector for detecting the midpoint pulse to sample bit positions at time intervals measured from the occurrence of the midpoint pulse. Each keyed storage includes a timing circuit coupled to the detector for detecting the start pulse or the detector of the midpoint pulse for producing a sampling pulse at a time interval during the time of occurrence of bits at the bit position which is to be sampled and a triggered storage having a trigger input coupled to an output of the sampler and an input coupled to the receiver for storing the level of the bit position at the bit position.

The bit positions may be used to encode a plurality of types of information including a control signal for controlling the activation of the receiver, the address of the receiver which is to receive the one or more frames of the transmitted data signal, the priority of the transmitted data signal, a control signal for the receiver, and data to be processed by the receiver. Any type of data may be encoded on the bit positions without limitation to the above examples.

Furthermore, a circuit is provided for signalling when there has been a failure of the receiver to receiver a plurality of successively transmitted frames. The circuit for detecting failure includes a restartable one-shot multivibrator which produces an output signal of one level when the successive frames are being received and another level when they are not being received.

Preferably, the timing circuit is a digital counter which counts a predetermined number of pulses derived from a clock signal, counted from the occurrence of the start pulse, which is produced by a clock signal coupled to the digital counter.

The detector of the start pulse includes a circuit, coupled to the signal receiver, for producing a pulse on an output of a predetermined duration which is longer than the duration of the start pulse in response to each of the received pulses or bits in the received data signal, an EXCLUSIVE OR gate having inputs coupled respectively to the receiver and an output of the circuit for producing a pulse of a predetermined duration and an output and an AND gate having inputs coupled respectively to the output of the EXCLUSIVE OR gate and the output of the circuit for producing a pulse.

DESCRIPTION OF THE PREFERRED EMBODIMENTS

Figure 1:
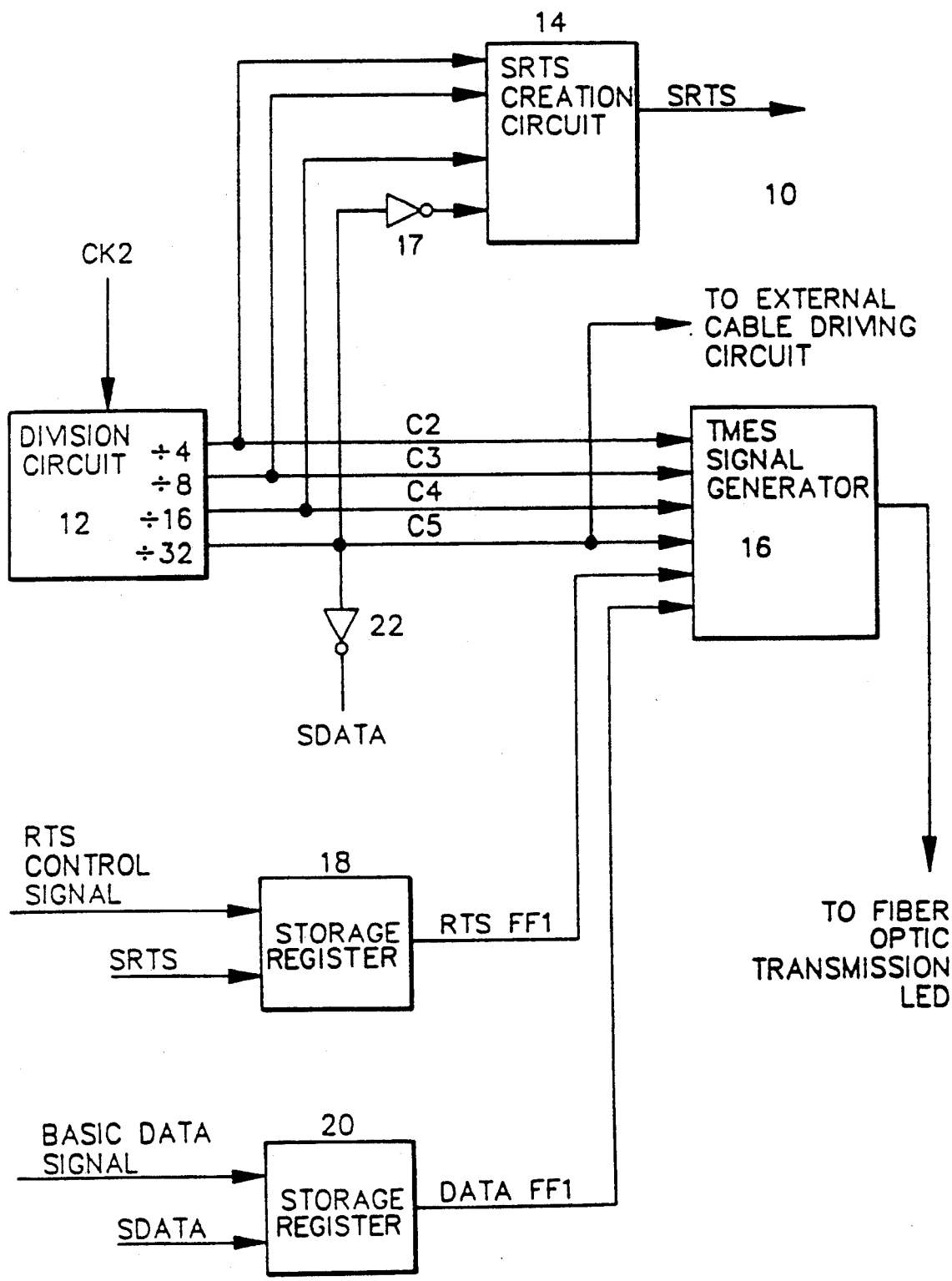
FIG. 1 illustrates a transmitter of a digital signal in accordance with the present invention.
Figure 2:
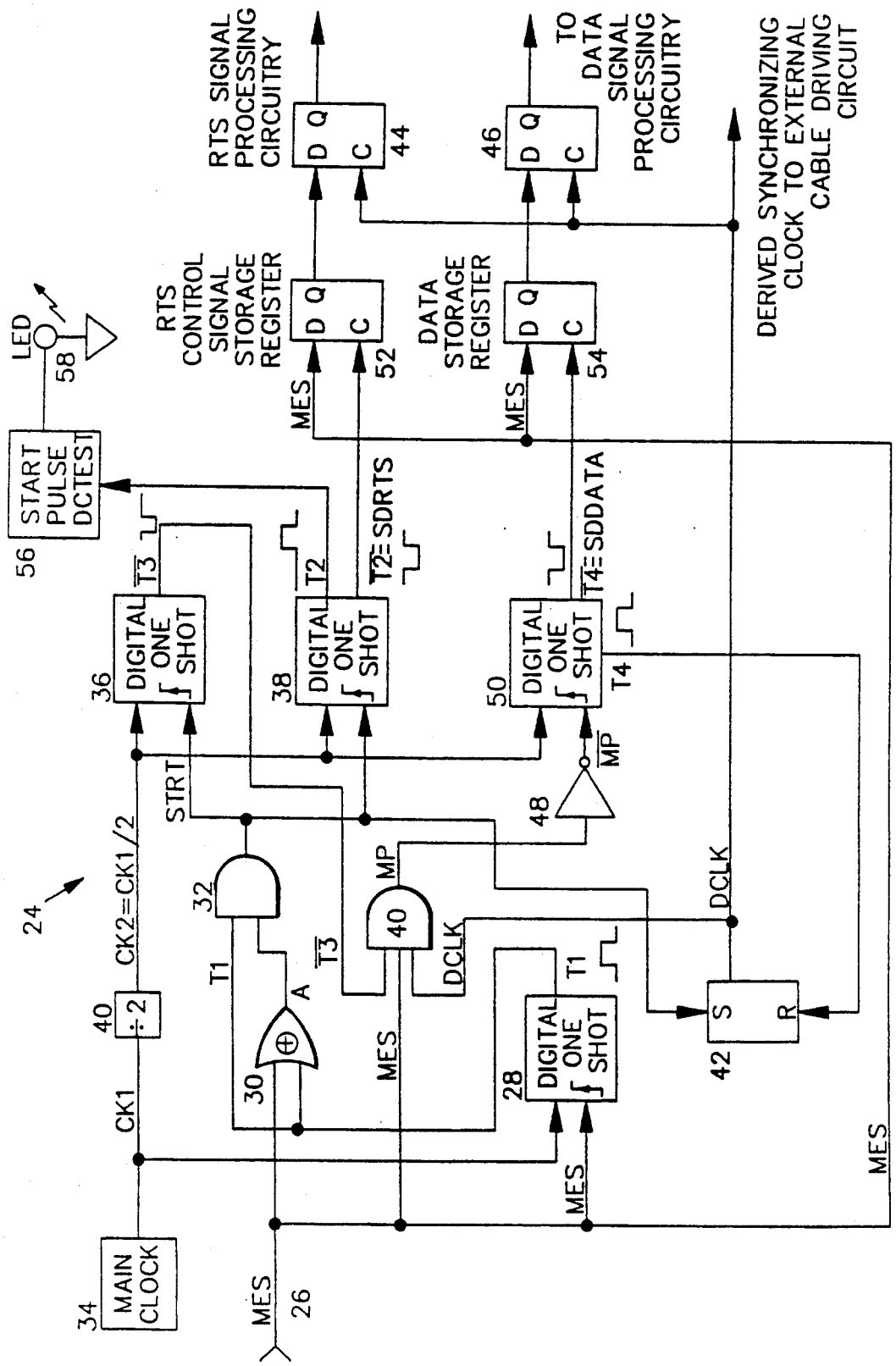
FIG. 2 illustrates a first embodiment of a receiver in accordance with the present invention.
Figure 3:
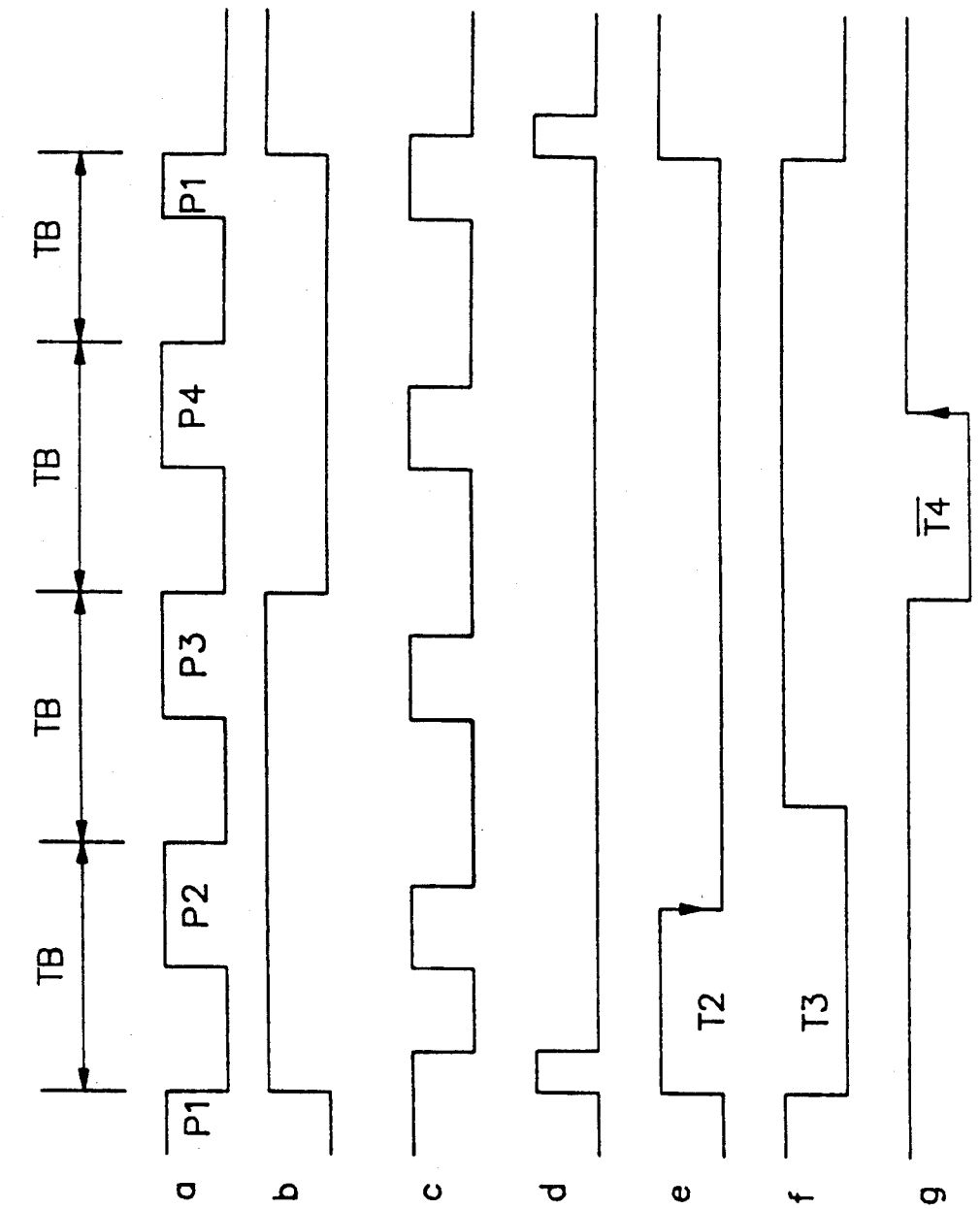
FIGS. 3a-g illustrate oscillograms of various signals within the receiver of FIG. 2.
Figure 4:
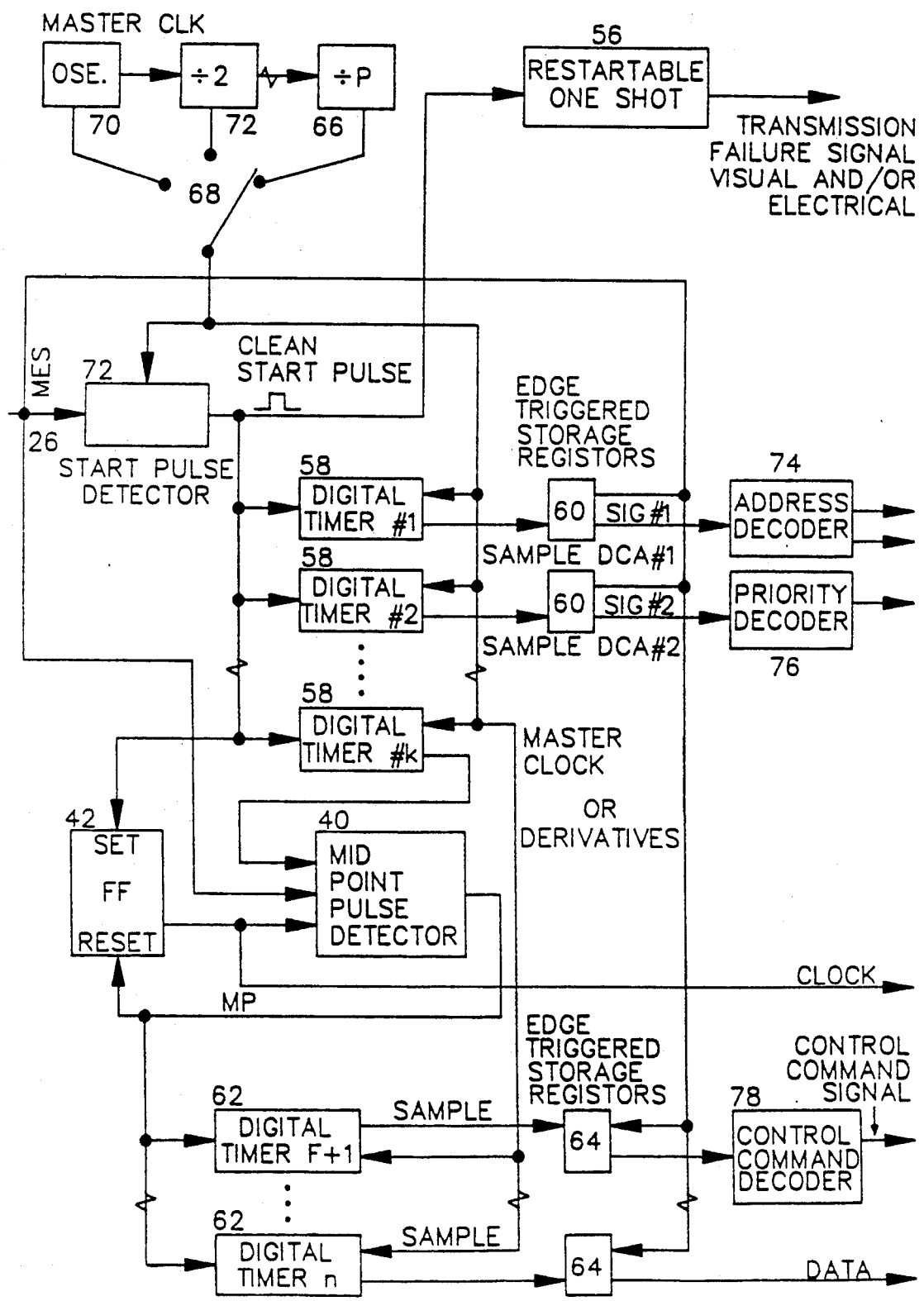
FIG. 4 illustrates another embodiment of a receiver in accordance with the present invention.

FIG. 1 illustrates a transmitter 10 in accordance with the present invention. The transmitter generates a composite digital signal in accordance with FIG. 3a which is discussed below. The composite signal with reference to FIG. 3a has four pulses identified by the legends "P1-P4" which constitute a frame of the digital signal to be transmitted. Pulse P1 has a time duration less than that of the remaining pulses P2-P4. Pulse P1 is a start pulse which is used for marking the beginning of a frame as described below. Signals P2 and P4 are actual high level bits which occur at a series of bit positions within the frame which are used for transmitting any type of information other than information for controlling the clock of the receiver. Preferably, the bits are integer numbers of pairs of bits positions. The basic time rate of the transmitter 10 is derived from a clock signal CK2 which is derived from the main clock of the system as illustrated in FIGS. 2, 4 and 6. The clock signal is coupled to a division circuit 12 which produces output pulses occurring respectively at $\frac{1}{4}$, $\frac{1}{8}$, 1/16 and 1/32 of the basic CK2, respectively, on lines C2, C3, C4 and C5. It should be noted that the C5 output signal is sent to an external cable driving circuit of conventional construction. C5 is the synchronizing clock for the transmitter. The division circuit 12 outputs C2-C5 are respectively coupled to a circuit 14 for creating the SRTS signal and a TMES signal generator 16. An inverter 17 is coupled between the divide by 16 output C4 of the division circuit 12 and the SRTS creation circuit 14. The SRTS output signal is defined by a Boolean operator equal to $C2 \cdot C3 \cdot \overline{C4} \cdot C5$. A storage register 18 is provided for storing the RTS control signal provided by the transmitter which is the signal specified by the BELL SYSTEM technical reference publication 41450, published November, 1981, for controlling the turning off of a receiver section 14 frames after the RTS signal is no longer being received by the receiver. The storage register 18 latches the RTS control signal in response to the presence of the SRTS signal produced by the SRTS creation circuit 14 described above. A storage register 20 latches the data signal which is to be sent a bit at a time with each frame in response to the generation of the S DATA signal which is produced by the output of inverting amplifier 22 having an input which is the C5 output from the division circuit 12. The BASIC DATA SIGNAL has a basic frequency equal to the frame rate. The frame rate is equal to one over the BASIC DATA SIGNAL baud rate of the synchronous system. The function of the storage register 20 is to produce the DATA FF1 signal which is sampled once per frame at the center of the frame. The DATA FF1 signal is illustrated as the P4 pulse in FIG. 3a. The TMES signal is defined by the following Boolean operator:

$$TMES = [(\overline{C3 \cdot C4}) \cdot (C2 \cdot C5)] + [(\overline{C3 \cdot C4}) \cdot \overline{C5}] + [\overline{C3} \cdot C4 \cdot [(RTSFF1 \cdot C5) + (DATAFF1 \cdot \overline{C5})]$$

The SRTS and TMES signal generators may be implemented by conventional combinatorial logic. The output of the TMES signal generator 16 is coupled to a light emitting diode which generates a modulated light beam which is coupled to a fiber optic transmission medium in a conventional manner.

FIG. 2 illustrates a first embodiment of a receiver 24 in accordance with the invention. The receiver has a receiving section 26 which is coupled to a fiber optic transmission medium, not illustrated, over which the digital signal is transmitted. The received signal is designated by the term MES. The received signal is illustrated in FIG. 3a. The start pulse is identified by P1 and the midpoint pulse is identified by P3. The additional bit positions, which are illustrated with bits present, are identified by P2 and P4. Signal P1 is equal to 0.25 $T_B$ as illustrated in FIG. 3. A starting pulse detector is provided which is comprised of a digital one shot 28, EXCLUSIVE OR gate 30, and AND gate 32. The digital one shot 28 is driven by a main clock 34 which corresponds to the system clock for both the transmitter and receiver sections. The main clock 34 may have a selectable frequency as described below with reference to FIG. 4. The output of the main clock 34 CK1 drives the digital one shot 28 which functions to count a predetermined number of pulses of the signal CK1 when a pulse is present in the MES signal applied to the receiving section 26. The rising edge of the pulses within the MES signal keys the digital one shot 28 into counting. The digital one shot 28 produces an output signal T1 of a high level until the predetermined count is reached at which point the signal goes to the low level. The output of the digital one shot 28 is illustrated in FIG. 3c. EXCLUSIVE OR gate 30 produces a high level signal when the respective input signals are of a different level. A high level signal occurs on the output of EXCLUSIVE OR gate 30 only when there is a difference between the levels of the pulses in the MES signal as illustrated in FIG. 3a and the output pulses from the digital one shot 28 as illustrated in FIGS. 3c which occurs only in the time interval measured between the falling edge of signal P1 and the falling edge of the output pulse T1 produced by the digital one shot. AND gate 32 logically ands the output signal T1 of the digital one shot 28 and the output of the EXCLUSIVE OR gate 30 to produce the STRT output signal as illustrated in FIG. 3d. The STRT signal produces a triggering signal for the digital one shot 36 which produces an output signal T3, as illustrated in FIG. 3f and to digital one shot 38 which produces output signal T2, as illustrated in FIG. 3e. The digital one shots 36 and 38 each count a different predetermined number of pulses produced by the output of dividing circuit 40 which divides the main clock rate by two. AND gate 40 functions as a midpulse detector for marking the falling edge of the signal P3 of FIG. 3a. The inputs to the AND gate 40 are respectively the output of the digital one shot 36, the MES signal, and the output of the clock signal producing flip/flop 42 which produces the output clock signal DCLK. The delay in the response of the output of the clock signal producing flip/flop 42 is used to feed back that signal to the input of the AND gate 40 to permit the correct logic condition to be present at the input of the AND gate. The output signal DCLK of the flip/flop 42 is the clock signal for controlling the processing of the additional bit positions represented by pulses P2 and P4 of FIG. 3a by the RTS signal processing circuitry 44 and the data signal flip/flop 46 in a manner described below. The MP output signal from AND gate 40 is inverted by inverter 48 to produce a rising edge pulse which occurs during the time interval of the falling edge of the pulse P3 to initiate the counting of the digital one shot 50. The output signal T4 is illustrated in FIG. 3g. RTS signal processing circuitry 52 processes the RTS signal present at the bit position which is occupied by bit P2 of FIG. 3a at the falling edge of signal T2 as illustrated in FIG. 3e. This circuitry is illustrated in detail in FIGS. 6A-L. Data storage register 54 latches the data bit present at the bit position illustrated by bit P4 of FIG. 3a upon the rising edge of signal $\overline{T4}$ of FIG. 3g. The data latched into the data signal storage register 54 is latched into the data storage register 46 upon the occurrence of the DCLK signal produced by the clock signal producing flip/flop 42. The DCLK signal is the derived synchronizing signal for the receiver. The output of the data signal 46 is coupled to the data signal processing circuitry which is not described herein in detail but which is illustrated in detail in FIGS. 6A-L. A start pulse detector 56 is coupled to the output of the digital one shot 38 for producing a high level signal to activate a light emitting diode when successive frames each containing the start pulse are being received. When successive frames are not being received, the level of the output signal from the start pulse detector changes which indicates that there is a transmission fault or that the frames of digital information are no longer being sent by the transmitter. A light emitting diode 58 or other indicator is coupled to the output of the start pulse detector for producing a signal indicating the receipt of information by the receiver from the transmitter.

FIG. 4 illustrates an alternative embodiment of a receiver in accordance with the present invention. The receiver of FIG. 4 differs principally from the receiver of FIG. 2 in its processing of more bit positions than FIG. 2. Like reference numerals identify like parts in FIGS. 2 and 4. In the embodiment of FIG. 4, a plurality of digital timers 58 initiate storage of the bit level present at the bit positions of the MES signal present at the receiver 26 prior to the midpulse in associated edge triggered registers 60. Similarly, a plurality of digital timers 62 initiate storage of the bits present at the bit positions after the midpulse in a plurality of associated edge triggered registers 64. It should be understood that in this embodiment equal numbers of digital timers 58 and 62 are provided as a consequence of the symmetry in the duty cycles of the high and low levels of the clock signal. The master clock 66 permits different clock frequencies to be chosen by the positioning of a multiple pole switch 68 in any on of three positions to select the clock frequency as the output of oscillator 70, divide by two circuit 72 or divide by integer P circuit 74 which may be any integer number. The present invention has the advantage that the digital timers automatically proportionally time their respective time intervals as a function of the frequency of the output from the master clock 66 which is applied by the switch 68 to the start pulse detector 72 without requiring the digital timers to be programmed for each different driving frequency. The start pulse detector 72 is identical to that described above with reference to FIG. 2. The midpulse detector 40 produces the midpulse in response to the output of digital timer number k and the MES signal in the same manner as the midpulse detector in FIG. 2. The clock signal producing flip/flop 42 functions in the same manner as that illustrated in FIG. 2. The restartable one shot 56 functions in the same manner as the start pulse detector of FIG. 2. An address decoder 74 is coupled to the output of the edge triggered storage register 60 which samples the additional bit position which contains addressing information. The address decoder 74 is a conventional address decoder which responds to a signal comprised of one or more bits to detect if the received signal is addressed to the particular receiver. A priority detector 76 is coupled to the output of the edge triggered storage register 60 which samples the additional bit position containing priority information. The priority decoder may be any conventional priority detection circuit. A control/command decoder 78 is coupled to the output of the edge triggered storage register 64 which samples the bit position encoding command information for the receiver. The control/command decoder may be any conventional decoder for decoding encoded digital commands to control the operation of the receiver. One example of such a command is the RTS signal described above with reference to the embodiment of FIG. 2. Data is outputted from the edge triggered storage register 64. The embodiment of FIG. 4 does not illustrate the application of the drived clock signal produced by the clock signal producing flip/flop 42 to an additional flip/flop such as 46 illustrated in FIG. 2.

Figure 5:
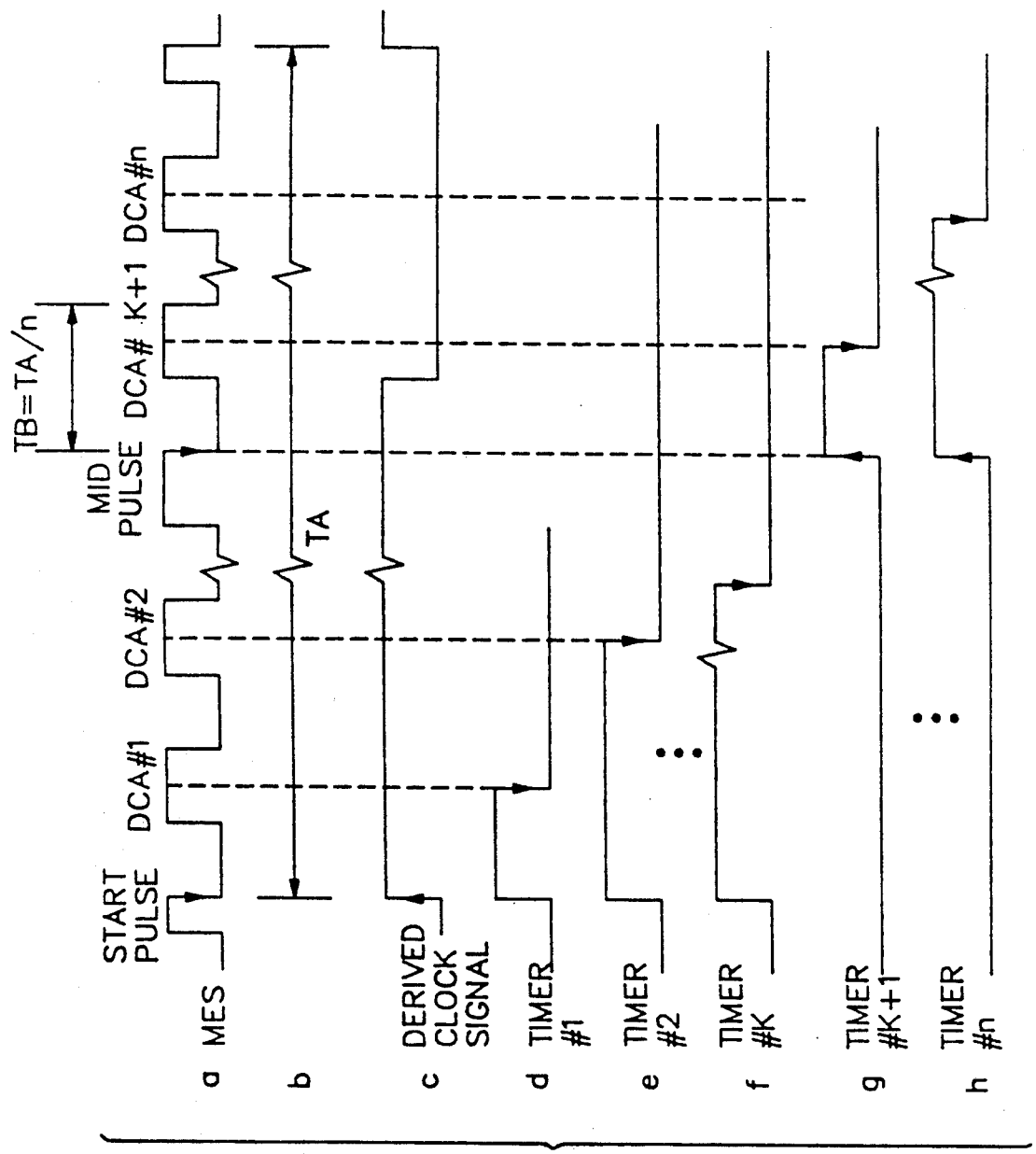
FIGS. 5a-h illustrate oscillograms of various signals within the receiver of FIG. 4.

The operation of the embodiment of FIG. 4 is described above with reference to FIG. 5. The input signal MES on the receiver section 26 is illustrated in FIG. 5a. The time duration between successive additional bit positions represented by DCA1-DCAn is equal to $T_B$ which is equal to $T_A \div n$ wherein n is an integer which is equal to the number of bit positions plus pulse positions and $T_A$ is the length of the derived clock signal, as illustrated in FIGS. 5b and 5c. FIGS. 5d-h illustrate the outputs of the respective digital timers 58 and 62 which sample the additional bit positions illustrated in FIG. 5a by DC1-DCAn. The arrows identifying the falling edge and the rising edge of the outputs of the timers identify the actual sampling point for the additional bit positions identified by DCA1-DCAn.

Figure 6A:
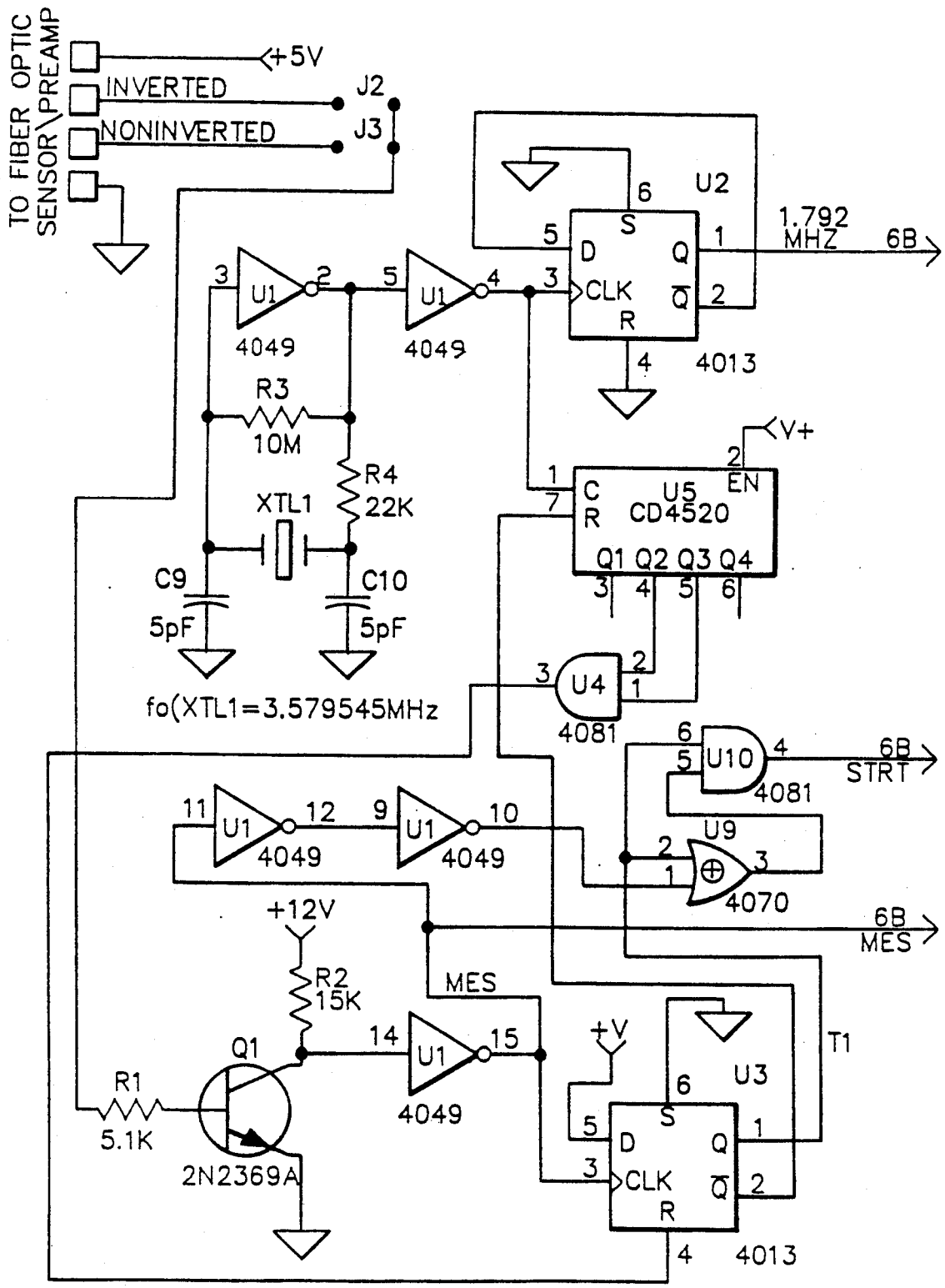
FIGS. 6A-6L illustrate a preferred embodiment of a combined transmitter and receiver in accordance with FIGS. 1 and 2.
Figure 6B:
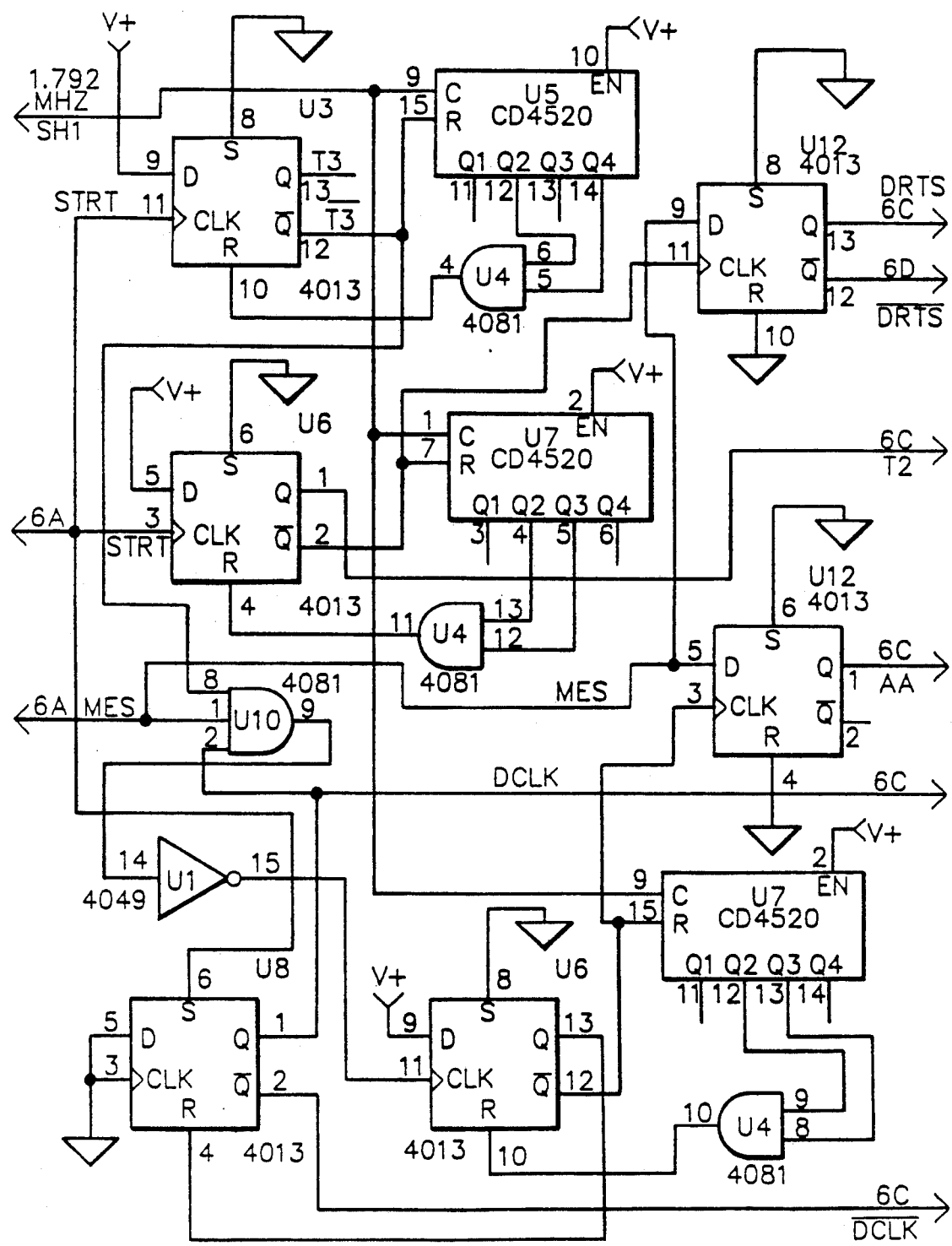
Figure 6C:
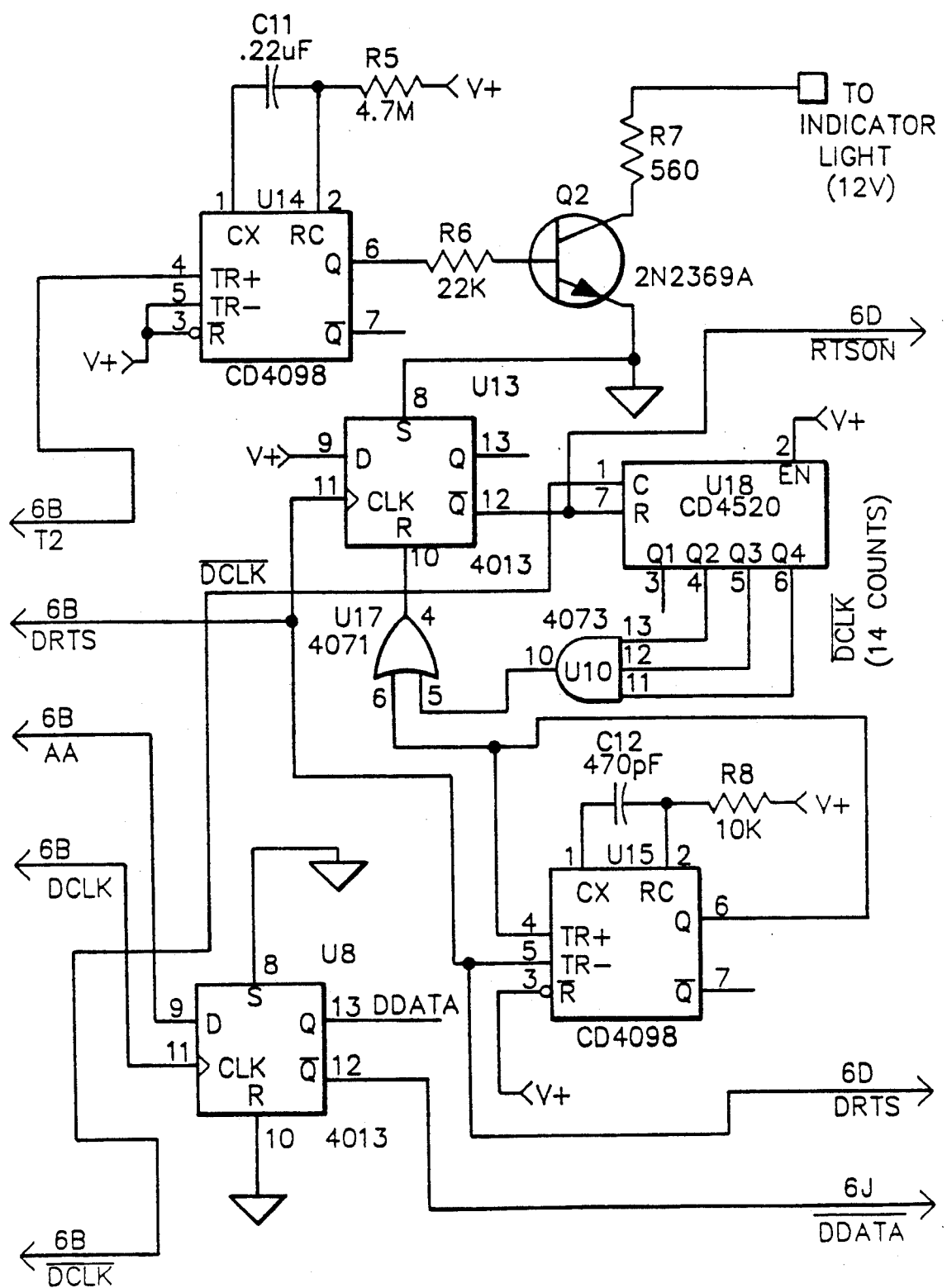
Figure 6D:
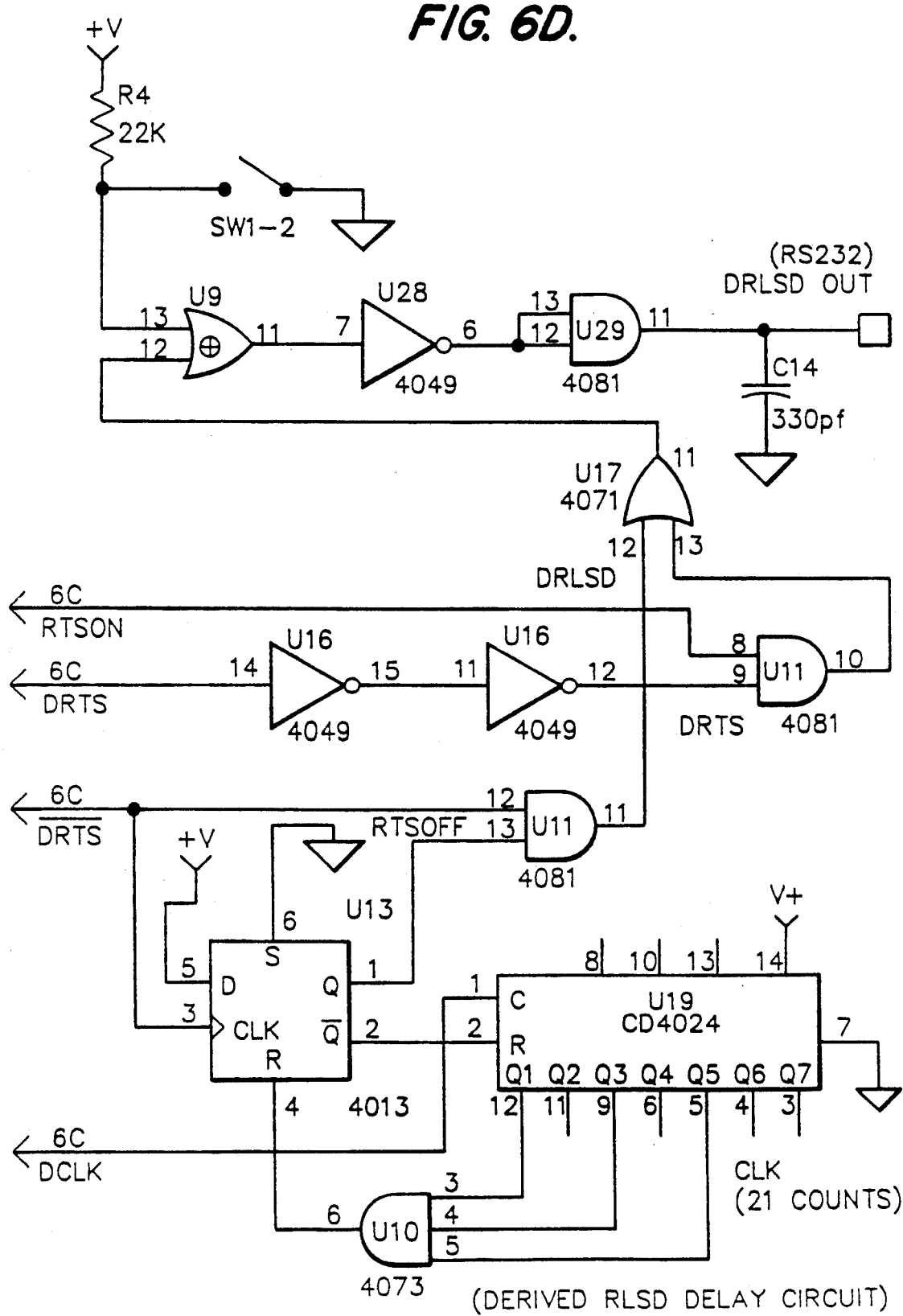
Figure 6E:
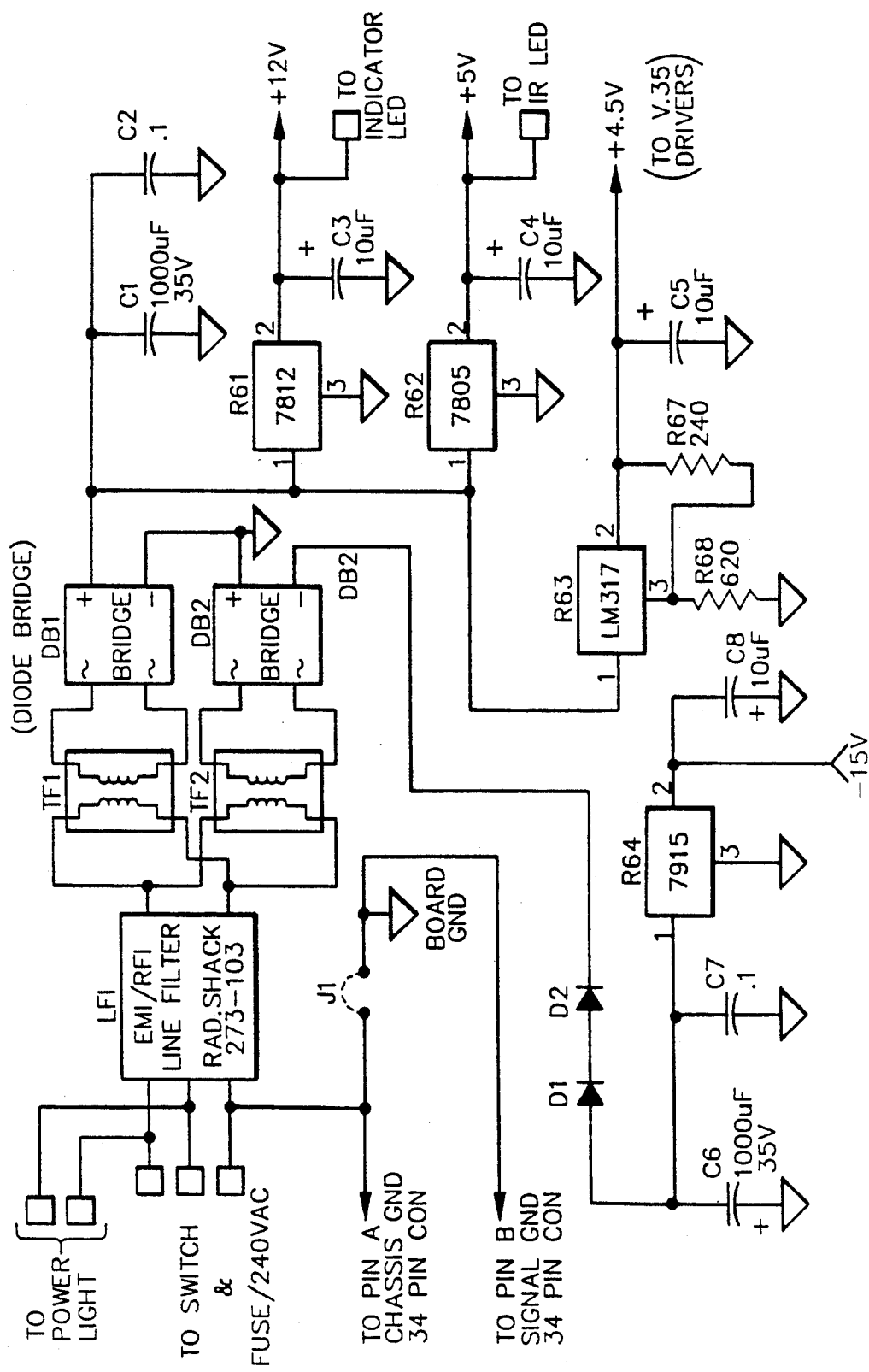
Figure 6F:
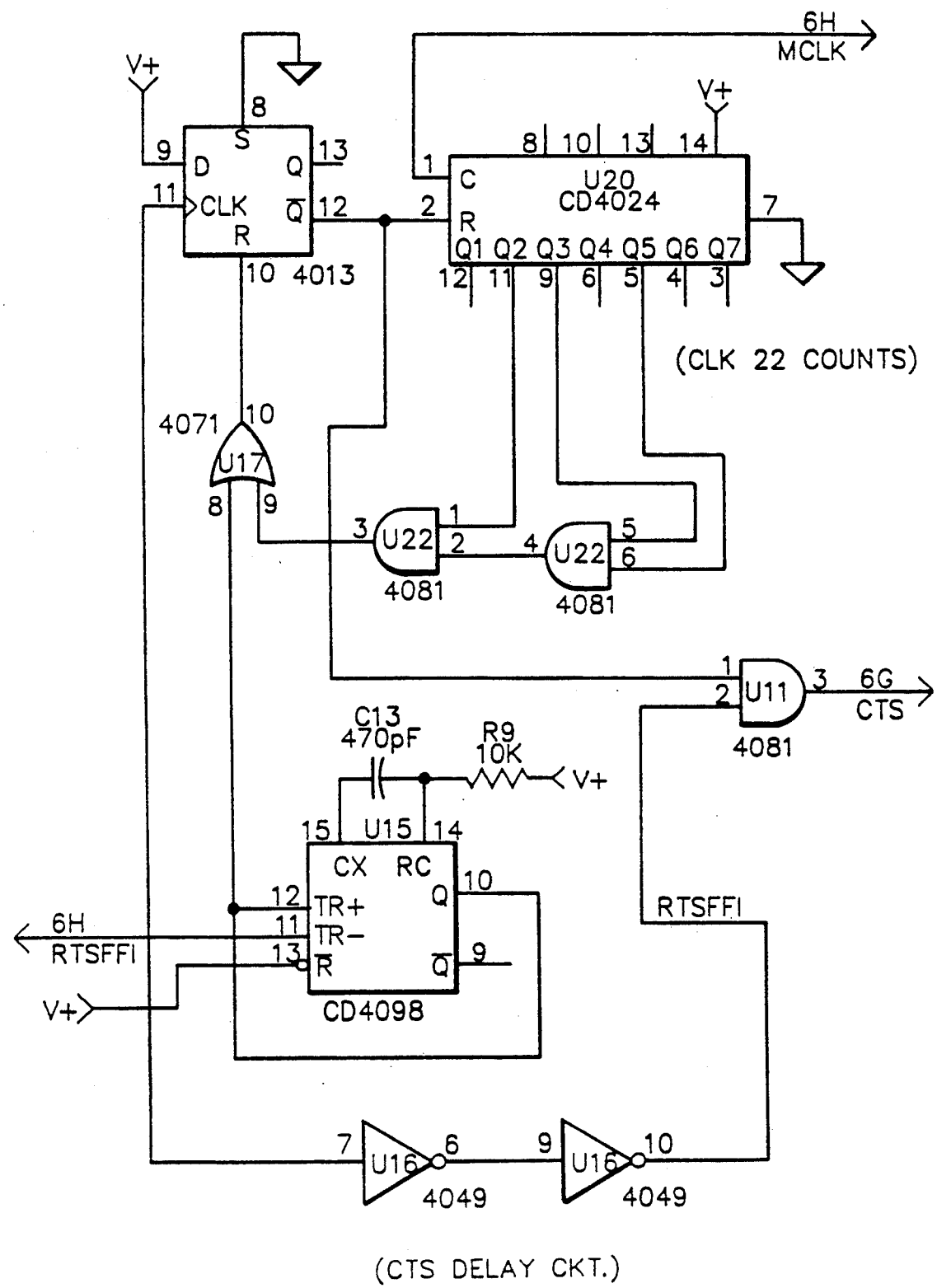
Figure 6G:
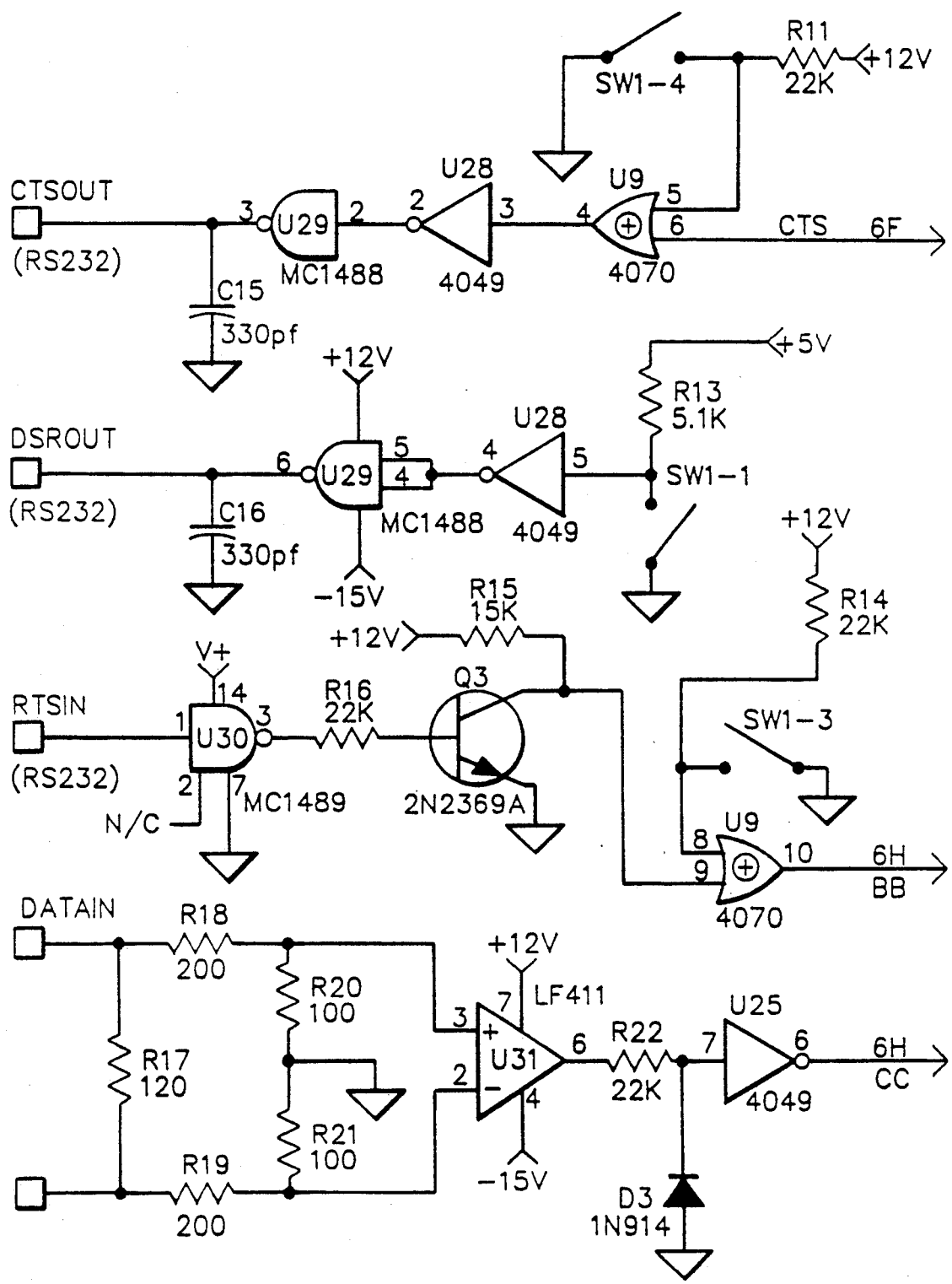
Figure 6H:
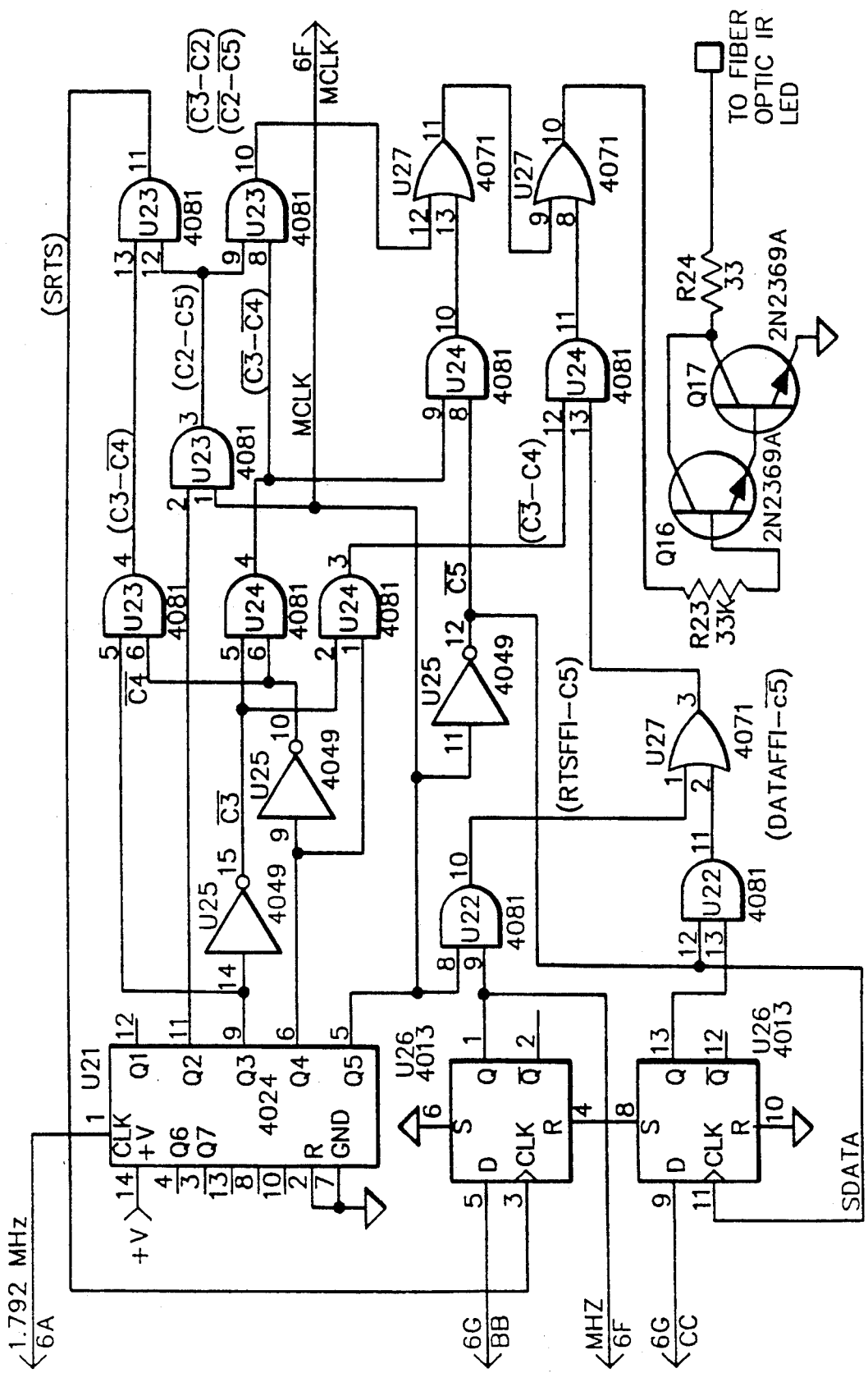
Figure 6I:
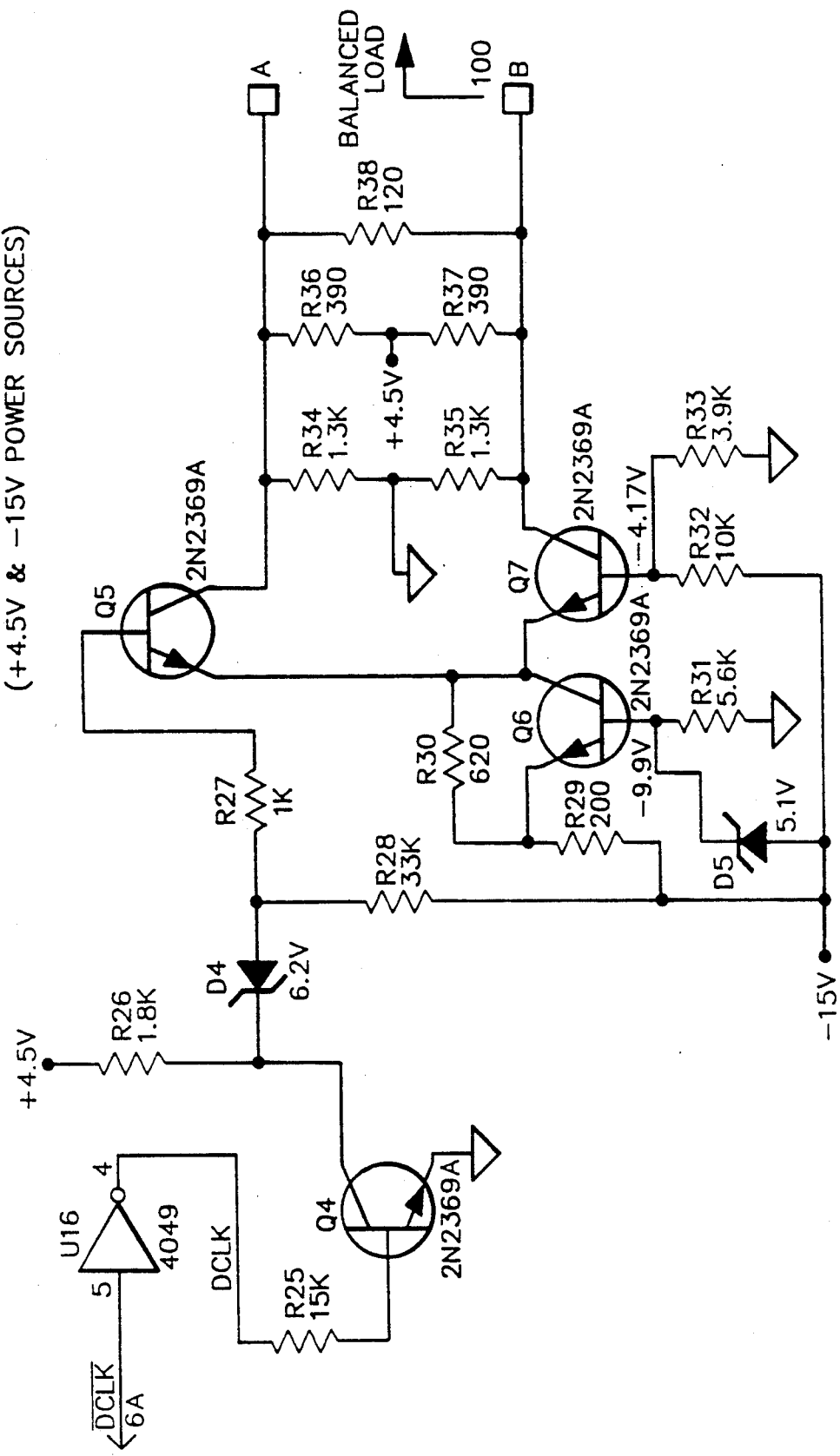
Figure 6J:
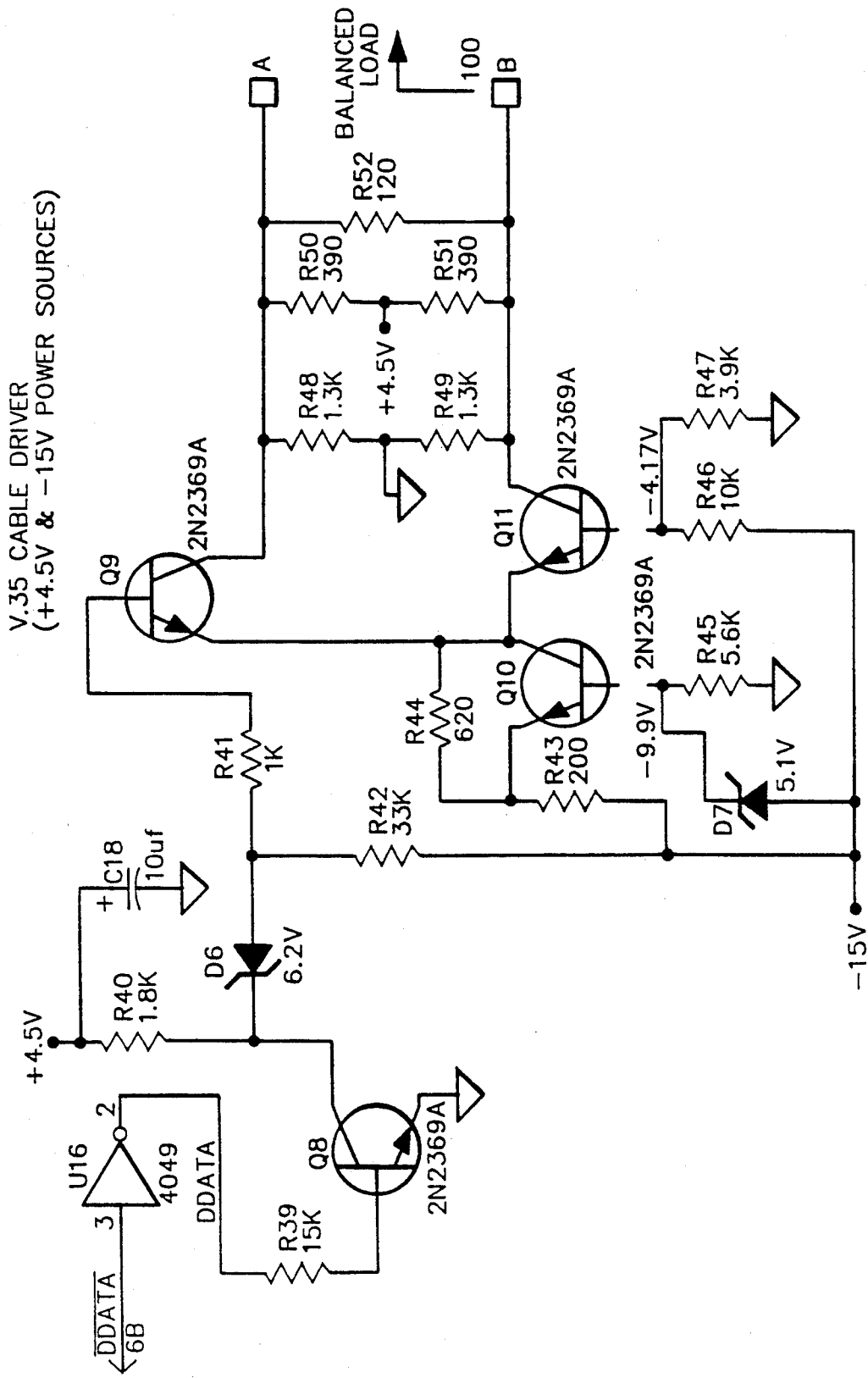
Figure 6K:
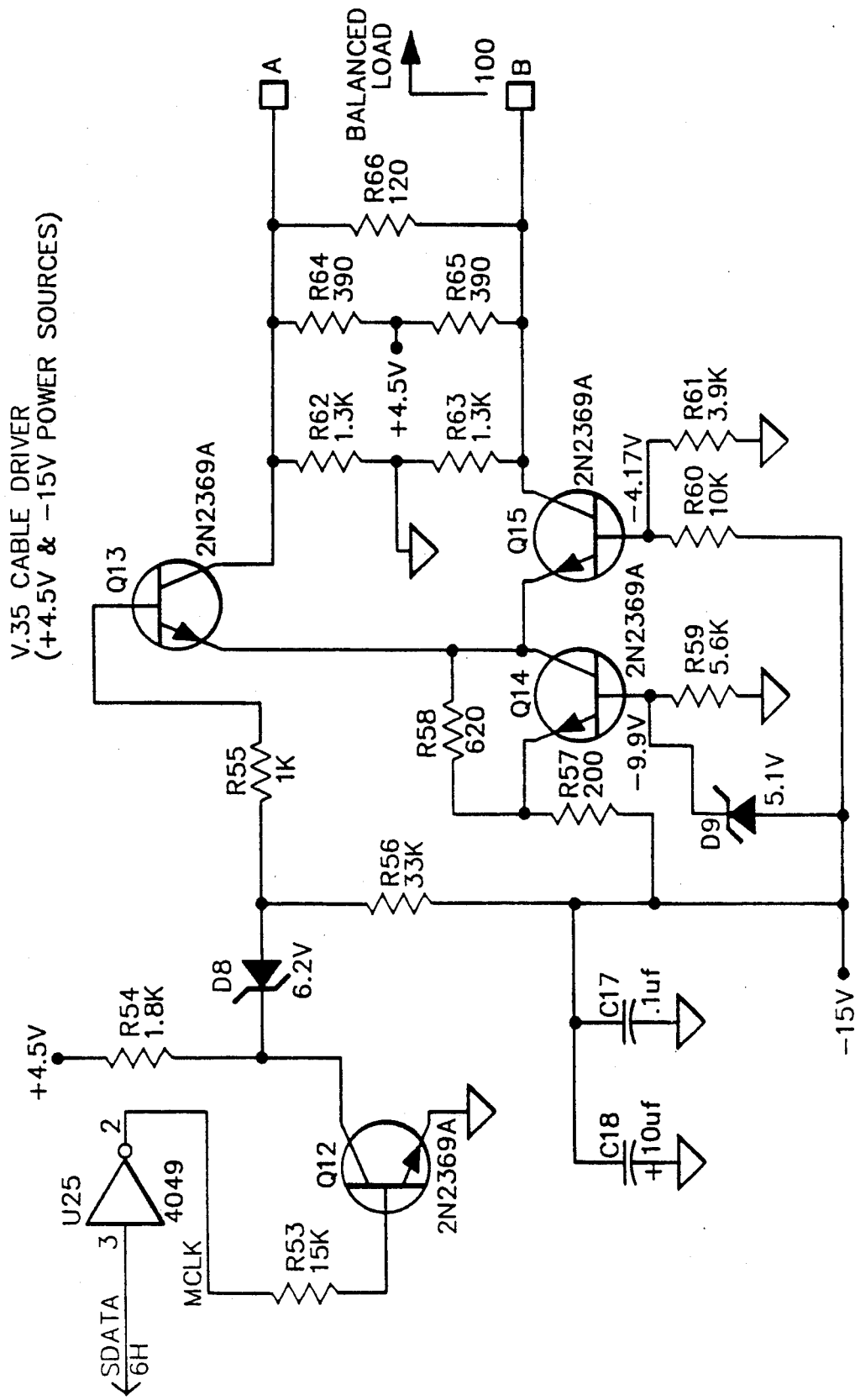
Figure 6L:
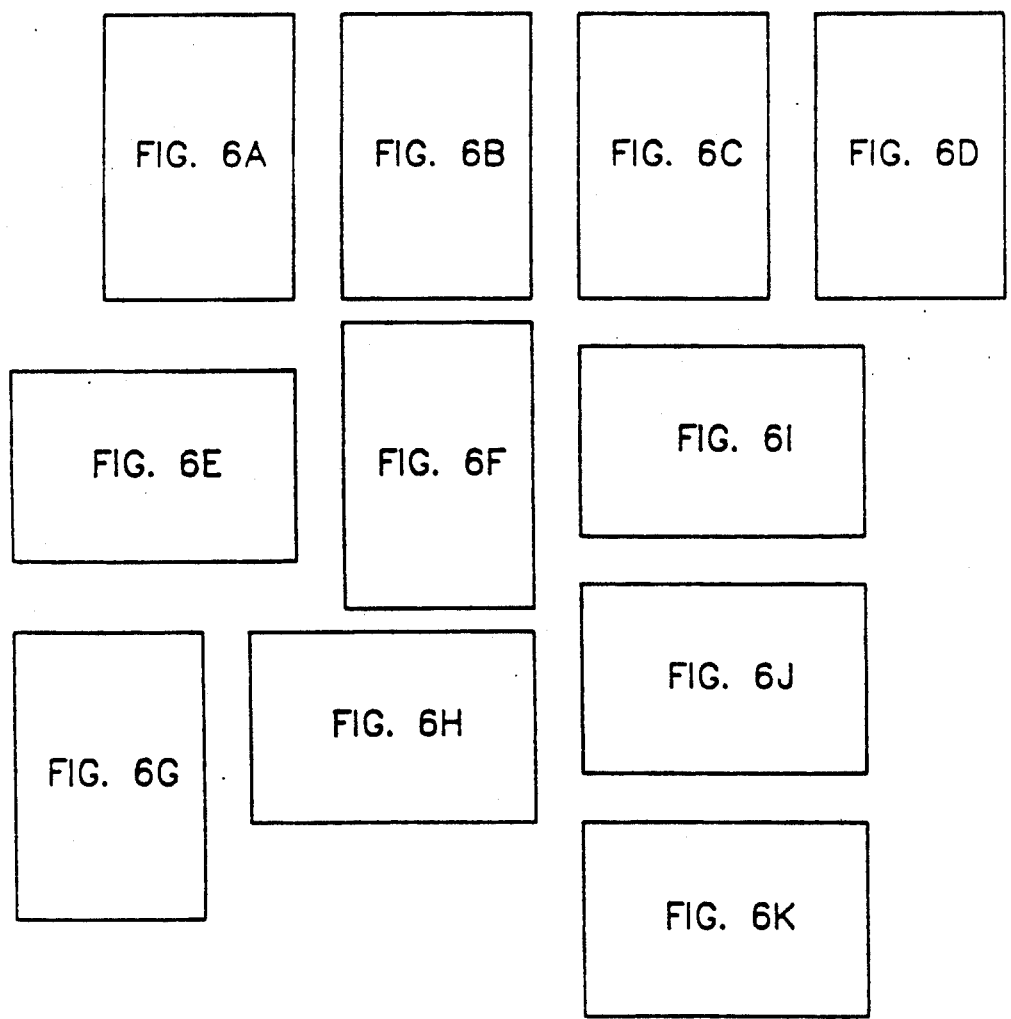

FIGS. 6A-L illustrate a wiring schematic of an actual transmitter and receiver in accordance with the present invention. Part numbers are identified by their industry known part identification number or their logic function identification. FIG. 6L illustrates the relationships of FIGS. 6A-K.

Numerous modifications may be made to the present invention without departing from the spirit and scope thereof. For example, while the preferred embodiment utilizes both a start pulse and a midpoint pulse to precisely synchronize the generation of the clock signal by the controlling of the states of a bistable circuit for generating the clock signal, it is within the scope of the present invention to omit the transmission of the midpoint pulse. When the midpoint pulse is omitted, an additional digital timer may be provided which counts a number of pulses produced by the clock which is substantially equal to half of the desired clock interval to thus ensure that the clock signal maintains a square wave configuration. For example, the V.35 specification permits the clock signal to have plus or minus 5% jitter in the transition point which permits it to occur within the range of 45-55% of the midpoint measured from the start of the clock pulse signal. Therefore, a locally generated midpulse is acceptable for producing proper system operation in many configurations.

I claim:

1. A receiver for receiving a transmitted data signal comprised of one or more frames of binary data which occur at a frame rate with each frame having a start pulse of a first time duration which marks the beginning of the frame, a midpoint pulse which marks the midpoint of the frame, and a plurality of bit positions within the frame for transmitting digital data, the midpoint pulse and each bit having a second time duration different than the first time duration comprising:

means for receiving the transmitted frames of the data signal;

means, coupled to the means for receiving the transmitted frames of data for detecting the start pulse within the frames of the transmitted data signal having an output on which the start pulse is produced;

means, coupled to the means for receiving the transmitted frame of data, for detecting the midpoint pulse within the frames of the transmitted data signal and having an output on which the midpoint pulse is produced; and means for sampling the bit positions, coupled to the start pulse and the means for detecting the midpoint pulse, which samples the bit position at fixed time intervals keyed to the start pulse and the midpoint pulse.

2. A receiver in accordance with claim 1 further comprising:

means, coupled to the means, for sampling a bit position, for processing the bit position, at the frame rate.

3. A receiver in accordance with claim 2 wherein the means for sampling is comprised of a keyed storage means coupled to the means for receiving for sampling the bit position.

4. A receiver in accordance with claim 3 wherein the keyed storage means comprises a plurality of keyed storage means each coupled to the mean for receiving with each keyed storage means sampling a different one of the bit positions, a first half of the keyed storage means being coupled to the frame for detecting the start pulse and to sample additional bit positions at time intervals measured from the occurrence of the start pulse and a second half of the keyed storage means sampling bit positions at time intervals measured as a function of the occurrence of the start pulse.

5. A receiver in accordance with claim 4 wherein each keyed storage means comprises a timing means producing a sampling pulse at a time interval during the time of occurrence of bits at the bit position which is to be sampled and a triggered storage means having a trigger input coupled to an output of the means for producing a sampling pulse and an input coupled to the means for receiving for storing the level of the bit position occurring at the bit position.

6. A method of transmitting a digital signal having a plurality of bits occurring in a frame with successive frames occurring at a frame rate comprising:

providing a basic data signal having a basic frequency equal to the basic frame rate;

sampling the basic data signal at a predetermined time within the frame to form one of the bits of the frame;

providing other signals to be encoded as the other bits within the frame and a start pulse which marks the beginning of the frame and a midpoint pulse which marks the midpoint of the frame, a transition at the midpoint of the frame controlling the sampling of bit positions at fixed time intervals in a receiver;

sampling the other signals which are to be encoded as the remaining bits of the frame at predetermined times within the frame with each other signal and the basic data signal being sampled at a separate time within the frame;

combining the sampled signals to form the frame; and transmitting the frame.

* * * * *